United States Patent
Nemoto

(10) Patent No.: US 11,364,953 B2
(45) Date of Patent: Jun. 21, 2022

(54) VEHICLE CONTROL SYSTEM

(71) Applicant: Toyota Jidosha Kabushiki Kaisha, Toyota (JP)

(72) Inventor: Takuya Nemoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 16/818,072

(22) Filed: Mar. 13, 2020

(65) Prior Publication Data
US 2020/0290678 A1 Sep. 17, 2020

(30) Foreign Application Priority Data
Mar. 15, 2019 (JP) .............................. JP2019-048946

(51) Int. Cl.
*B62D 15/02* (2006.01)
*G05D 1/02* (2020.01)

(52) U.S. Cl.
CPC ....... *B62D 15/0285* (2013.01); *G05D 1/0212* (2013.01); *G05D 2201/0213* (2013.01)

(58) Field of Classification Search
CPC ............. B62D 15/0285; G05D 1/0212; G05D 2201/0213
USPC .......................................................... 701/25
See application file for complete search history.

(56) References Cited

U.S. PATENT DOCUMENTS

| | | | |
|---|---|---|---|
| 2016/0284217 A1* | 9/2016 | Lee ......................... | B60D 1/30 |
| 2017/0016738 A1* | 1/2017 | Sakuma ............ | G01C 21/3617 |
| 2018/0208245 A1* | 7/2018 | Mizutani ............ | B62D 15/0285 |
| 2018/0215413 A1* | 8/2018 | Inagaki ............. | B62D 15/0285 |
| 2019/0248414 A1* | 8/2019 | Ohtani ................... | B62D 6/001 |
| 2019/0344828 A1* | 11/2019 | Omori ................... | B60W 50/14 |
| 2020/0156625 A1 | 5/2020 | Kogure et al. | |

FOREIGN PATENT DOCUMENTS

| | | |
|---|---|---|
| JP | 2018-45397 A | 3/2018 |
| JP | 2018-138929 A | 9/2018 |
| WO | 2019/031107 A1 | 2/2019 |

\* cited by examiner

*Primary Examiner* — Yazan A Soofi
(74) *Attorney, Agent, or Firm* — Dinsmore & Shohl LLP

(57) ABSTRACT

The vehicle control system includes, a path generation unit that generates a target path for parking a vehicle at a parkable target parking space in a destination area including a parking area, a travel control unit that causes the vehicle to travel so as to follow the target path, and a control device that controls the path generation unit and the travel control unit to automatically park the vehicle at the target parking space. The path generation unit includes a search path generation unit that generates a search path for searching for a target parking space as a target path based on vehicle peripheral information including an image of the periphery of the vehicle without using map data in the destination area.

10 Claims, 9 Drawing Sheets

VEHICLE CONTROL SYSTEM

CROSS-REFERENCE TO RELATED APPLICATION

The present application is based on, and claims priority from, Japanese Patent Application Serial Number 2019-048946, filed on Mar. 15, 2019, the disclosure of which is hereby incorporated by reference herein in its entirety.

BACKGROUND

Field

The present disclosure relates to a vehicle control system, and more particularly, to a vehicle control system for automatically searching for a parking space of a vehicle.

Background

Japanese Patent Application Laid-Open No. 2018-138929 discloses a technique relating to a vehicle operating device for parking an automated driving vehicle in a parking frame in a parking area. In this technique, the vehicle operation device sets a range having an extension in the parking area and including a plurality of parking frames as a range of a destination before specifying a parkable parking frame. Next, the vehicle operating device sets a travel path to the range of the destination based on the path search condition, and controls the automated driving vehicle so as to travel the set travel path. Then, the vehicle operation device detects a parking frame that can be parked within the range of the destination, and parks the automated driving vehicle in the detected parking frame.

SUMMARY

In the above-described technique, when setting a travel path in a parking area, map data stored in a storage unit is referred to. For this reason, in the above-mentioned technique, when the map data in the parking area cannot be acquired in advance, there is a problem that the travel path in the parking area cannot be set and the vehicle cannot be automatically driven in the parking area.

The present disclosure has been made in view of the above-mentioned problems.
It is an object of the present disclosure to provide a vehicle control system capable of automated parking a vehicle in a parking space in a parking area even when map data in the parking area cannot be acquired in advance.

In order to solve the above problems, the first disclosure is applied to a vehicle control system for performing automated parking control for automatically park a vehicle at a parkable target parking space in a destination area including a parking area. The vehicle control system includes a processor configured to, when the automated parking control is executed, generate a search path for searching for the target parking space as a target path based on vehicle peripheral information including an image of a periphery of the vehicle without using map data in the destination area, and cause the vehicle to travel so as to follow the target path.

The second disclosure has the following further features in the first disclosure.
The vehicle peripheral information includes traveling propriety information for determining traveling propriety of the vehicle.

The third disclosure has the following further features in the first or second disclosure.
The vehicle peripheral information includes traveling priority information for determining a priority of the traveling direction of the vehicle.

The fourth disclosure has the following features in any one of the first to third disclosures.
The vehicle peripheral information includes parking possibility information for determining a direction in which parking possibility is high.

The fifth disclosure has the following features in any one of the first to fourth disclosures.
The processor is configured to search for the target parking space based on the vehicle peripheral information without using map data in the destination area.

The sixth disclosure has the following features in any one of the first to fifth disclosures.
The processor is configured to, when the target parking space is searched, generate a parking path to park the vehicle at the target parking space as the target path based on the vehicle peripheral information without using map data in the destination area.

The seventh disclosure has the following features in any one of the first to sixth disclosures.
The processor is configured to alternatively select a first mode in which the automated parking control is not executed and a second mode in which the automated parking control is executed in the destination area, stop the vehicle when the vehicle arrives at the destination area when the first mode is selected, and start the automated parking control successively after the vehicle arrives at the destination area when the second mode is selected.

According to the vehicle control system of the first disclosure, it is possible to generate a search path for searching a parking space of a destination area without using map data. As a result, even in the destination area where no map data exists, it is possible to automatically search for the parking space and park the vehicle.

According to the vehicle control system of the second disclosure, the target path is generated based on the traveling propriety information. Therefore, according to the present disclosure, it is possible to prevent a target path that cannot be traveled from being generated.

According to the vehicle control system of the third disclosure, the target path is generated based on the traveling priority information. Therefore, according to the present disclosure, it is possible to search for the target parking space while preventing the smooth traffic of the destination area from being obstructed.

According to the vehicle control system of the fourth disclosure, the target path is generated based on the parking possibility information. Therefore, according to the present disclosure, it is possible to efficiently search for the target parking space.

According to the vehicle control system of the fifth disclosure, the target parking space of the destination area may be searched without using the map data. This makes it possible to automatically search for the target parking space while traveling on the search path even in the destination area where the map data does not exist.

According to the vehicle control system of the sixth disclosure, the parking path to the target parking space of the destination area can be generated without using the map data. This makes it possible to automatically park the vehicle at the target parking space even in the destination area where the map data does not exist.

According to the vehicle control system of the seventh disclosure, it is possible to prevent an unintended automated parking control from being started when the vehicle arrives at the destination area.

DETAILED DESCRIPTION

Hereinafter, embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessary to the present disclosure unless explicitly described otherwise, or unless the present disclosure is explicitly specified by the structures, steps or the like theoretically.

Figure 1:
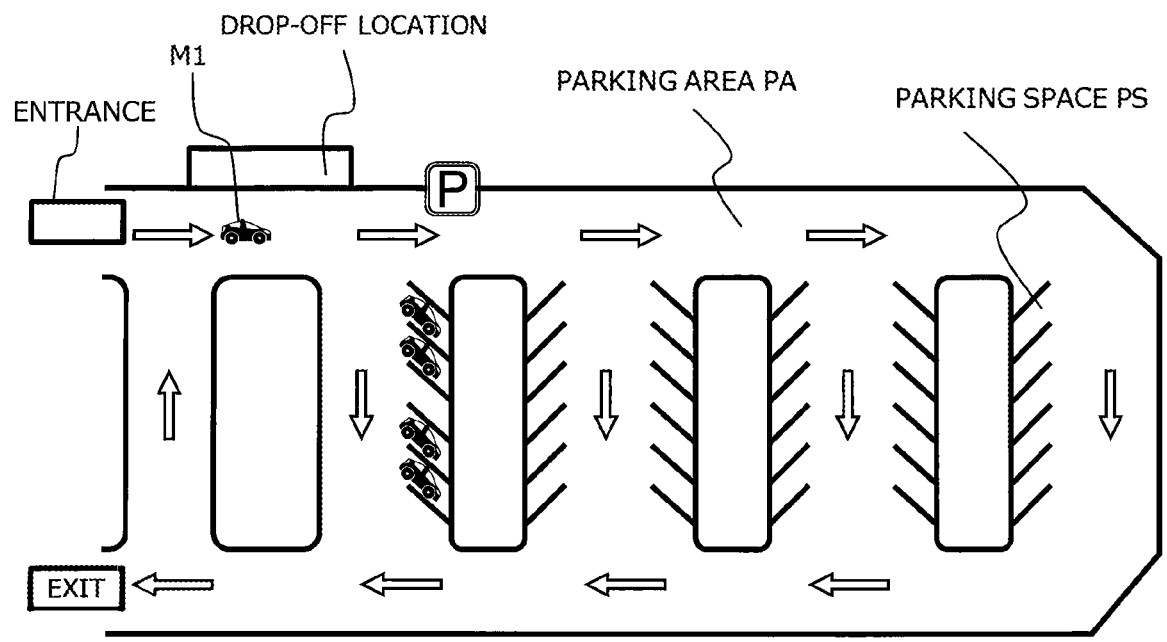
FIG. 1 is a conceptual diagram for explaining an automated parking control by a vehicle control system according to an embodiment.

1. Embodiment 1-1. Summary of Automated Parking Control by Vehicle Control System FIG. 1 is a conceptual diagram for explaining automated parking control by the vehicle control system according to the present embodiment. The vehicle control system is mounted on a vehicle, and performs automated parking control for parking the vehicle by automated driving without using map data.

In the following description, the vehicle on which the vehicle control system is mounted is referred to as "vehicle M1". The section for parking the vehicle is denoted as "parking space PS", and the parking range including the plurality of parking spaces PS is denoted as "parking area PA".

There may be no map data available on the premises of a commercial facility or the like. In addition, even if map data exists on the premises, there is a possibility that the current state is not accurately reflected, for example, the data is not updated. For this reason, in the automated driving using the map data, there is a possibility that the vehicle cannot be automatically parked in the parking space on the premises.

Therefore, in the vehicle control system according to the present embodiment, automated parking control independent of map data is performed. In the automated parking control, the following parking space search process and automatic parking process are executed using vehicle peripheral information detected by a camera, a radar, or the like mounted on the vehicle M1.

The automated parking control may be configured to start when the vehicle M1 detects that a driver gets off at a drop-off location in a destination area such as a commercial facility. The automated parking control may be started by a button operation or the like by a driver. In the automated parking control, it does not matter whether the vehicle M1 is manned or unmanned.

When the automated parking control is started, first, a search path for searching a parking space in the parking area is generated. This search path is hereinafter referred to as a "first path" T1, and the process of generating the first path is hereinafter referred to as a "first path generation process". The first path generation process is characterized in that the first path is generated without using the map data of the destination area including the parking area PA.

The first path T1 is a target path for indicating a moving direction in which the vehicle M1 should travel based on vehicle peripheral information detected by a camera, a radar, or the like mounted on the vehicle M1. The vehicle peripheral information includes, for example, static information such as road signs indicating one-way traffic, prohibition of entry, and the like, partition lines, road signs, poles, fences, guard rails, and the like, as well as dynamic positional information of a moving body such as another vehicle or a person.

Figure 2:
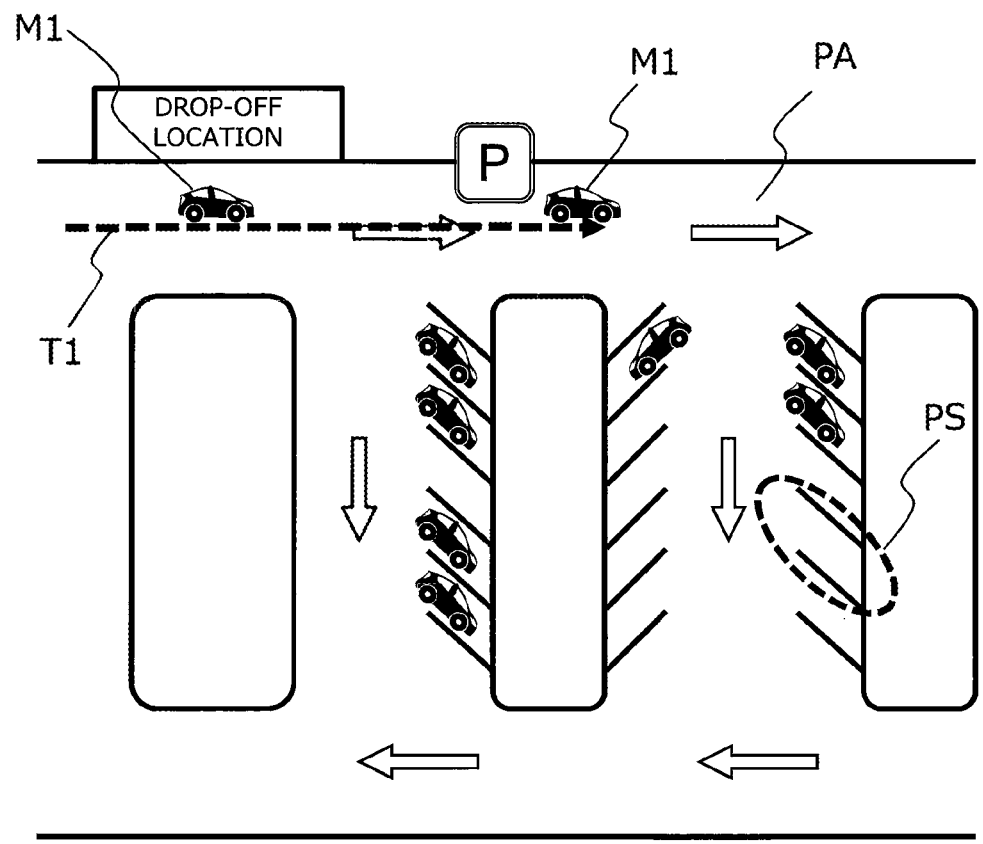
FIG. 2 is a diagram showing an example of a first path generated in the automated parking control.

FIG. 2 is a diagram showing an example of a first path generated in the automated parking control. In the first path generation process, a first path is generated based on the detected vehicle peripheral information. The vehicle peripheral information used in the first path generation process includes three pieces of traveling propriety information, traveling priority information, and parking possibility information. The traveling propriety information is vehicle peripheral information relating to the traveling propriety of the vehicle M1, and includes, for example, target information such as an entrance prohibited area, a barrier, a fence, a guard rail, and a pole. The traveling priority information is vehicle peripheral information related to the traveling priority of the vehicle M1, and includes, for example, information of a target object such as a road sign (arrow display) indicating the priority of the traveling direction of the vehicle (sign display). The parking possibility information is vehicle peripheral information regarding the parking possibility of the vehicle M1, and is information that can be used to determine the direction in which the parking possibility is high. The parking possibility information includes, for example, information on a stopping vehicle, a wheel stop, a parallel white line representing a partition line of a parking space, a signboard or a road sign of a parking mark (P mark), a pole for separating a person and a vehicle, and the like.

In the first path generation process, first, a path in a direction in which the vehicle M1 can move is generated as the first path T1 based on the traveling propriety information. In the first path generation process, when there is a plurality of movable directions, a path in a direction to be prioritized in terms of traffic is generated as the first path T1 based on the traveling priority information. Further, in the first path generation process, based on the parking possibility information, a path toward a direction in which the possibility of reaching a parkable target parking space becomes higher is generated as the first path T1.

In the generation of the first path using the parking possibility information, for example, the following generation operation is performed. When the spreading direction of the parking area PA is directly obtained from the landmark information included in the parking possibility information, a path in a direction closer to the spreading direction is selected as the first path. Such landmark information corresponds to, for example, a guide plate of the parking area PA, a road sign, a road mark, and the like. In addition, it is also possible to detect the spread of the space as the parking possibility information and select a path in a direction closer to the spread direction. Further, it may be determined that a place where persons, vehicles, or the like move is a place where persons gather. There is a high possibility that there is a parking space in such a place where persons and vehicles intersect with each other. Therefore, when the movement of a person or a vehicle is detected as the parking possibility information, a path close to the direction of the moving object can be selected.

When the first path is generated, the vehicle M1 is automatically driven so as to follow the generated first path. During the automatic operation of the vehicle M1, a parking space search process for searching for a parkable parking space is executed. In the parking space search process, parkable target parking spaces are searched for by extracting information useful for specifying the target parking space, such as a wheel stop, a white line, a parking situation, and the like, from the information included in the vehicle peripheral information. After the target parking space is set, an automatic parking process for automated parking the vehicle M1 to the target parking space is performed.

Figure 3:
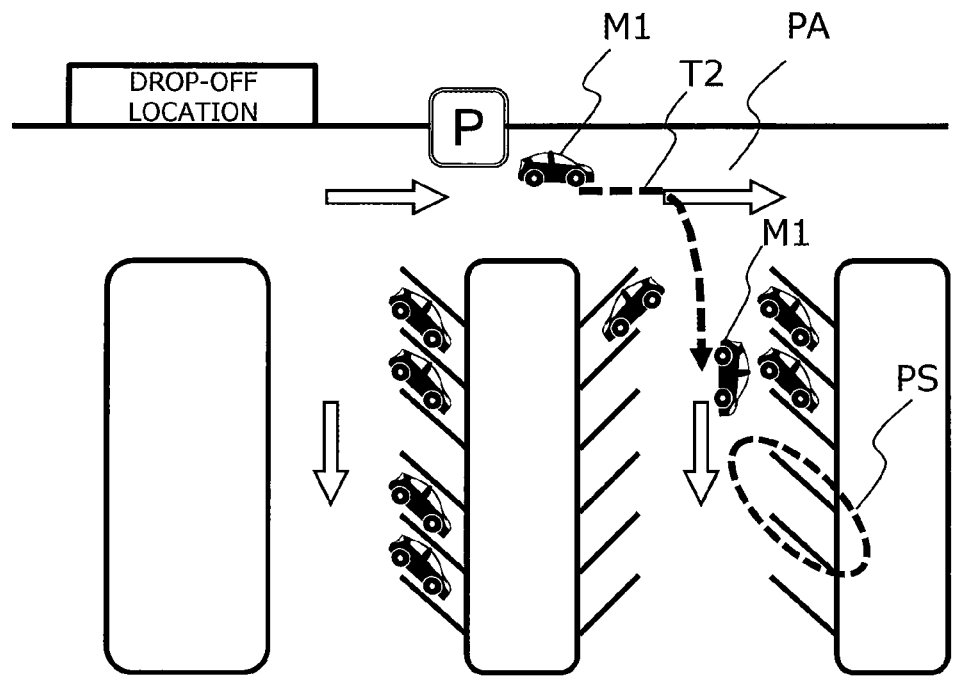
FIG. 3 is a diagram showing an example of a second path generated in an automatic parking process.

In the automatic parking process, a parking path that moves from the current position of the vehicle M1 to the front of the target parking space is generated. This parking path is hereinafter referred to as the "second path" T2. FIG. 3 is a diagram showing an example of the second path generated in the automatic parking process. As shown in FIG. 3, for example, the shortest path among the paths on which the vehicle M1 can travel may be selected as the second path T2. As is the first path generation, the second path is generated without using the map data of the destination area including the parking area PA. When the second path T2 is generated, the vehicle M1 is automatically driven so as to follow the generated second path T2.

Figure 4:
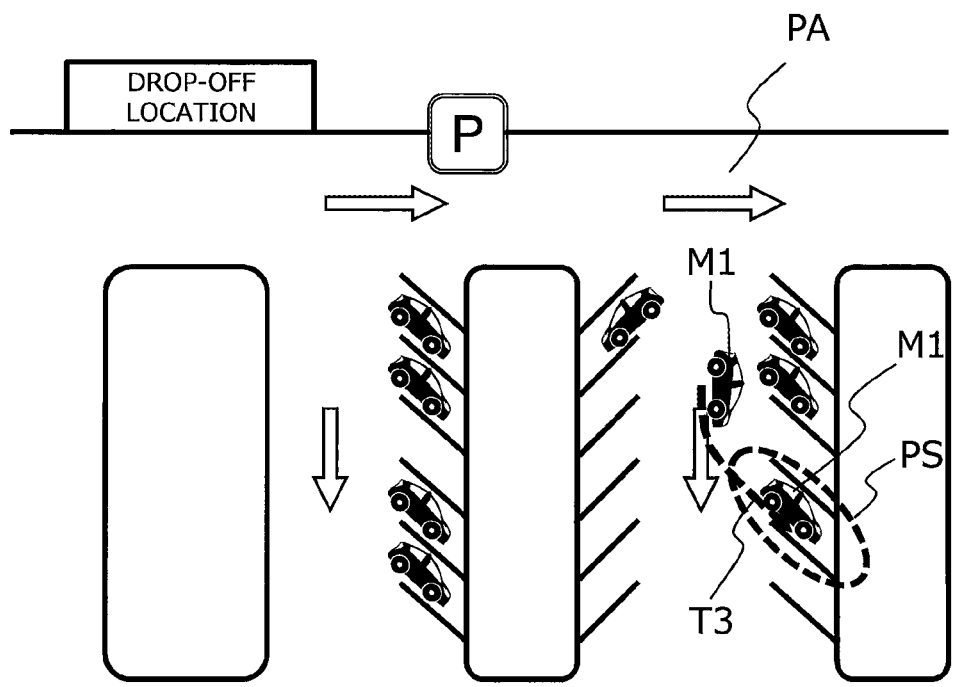
FIG. 4 is a diagram showing an example of a third path generated in the automatic parking process.

When the vehicle M1 reaches in front of the target parking space, a parking path is generated for parking the vehicle M1 in a compartment of the target parking space. This parking path is hereinafter referred to as "third path" T3. FIG. 4 is a diagram showing an example of a third path generated in the automatic parking process. As shown in FIG. 4, the third path T3 may be a path for parking the vehicle M1 by forwarding the vehicle M1. The third path T3 may be, for example, a path accompanied by backward movement of the vehicle M1 or switching of steering. As is the first path generation, the third path is generated without using the map data of the destination area including the parking area PA. When the third path T3 is generated, the vehicle M1 is automatically parked at the target parking space so as to follow the generated third path T3.

According to such automated parking control, automatic search of the parking space and automatic parking can be performed without referring to the map data of the destination area.

1-2. Configuration Example of Vehicle Control System

Figure 5:
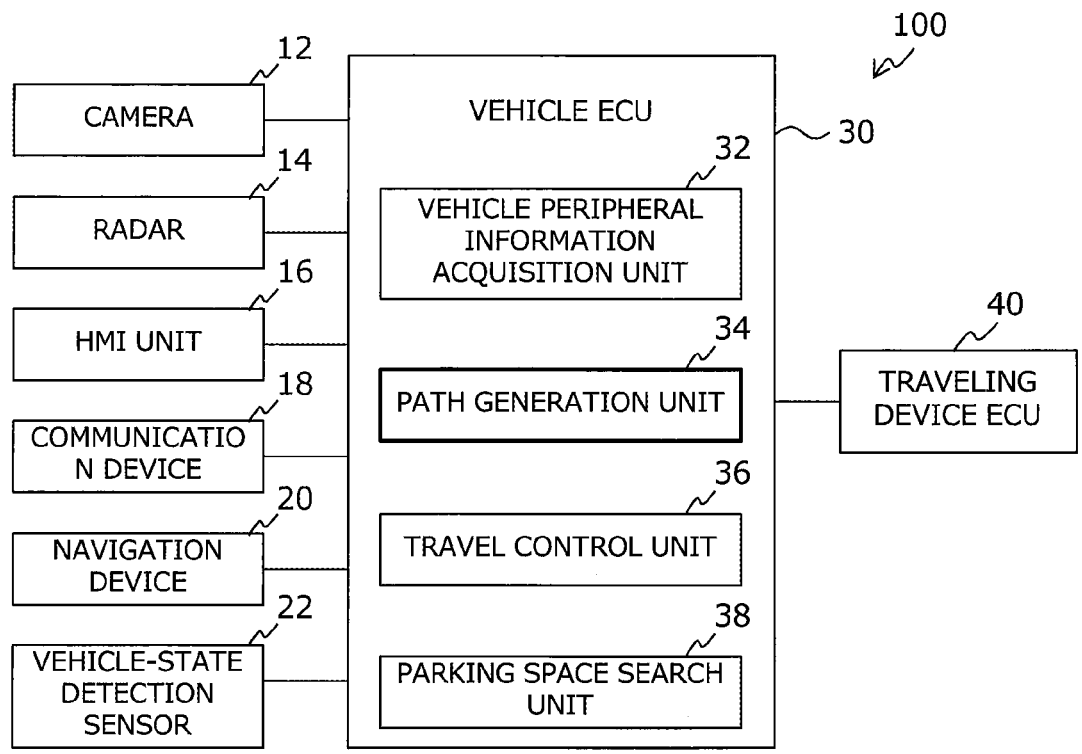
FIG. 5 is a block diagram showing an example of a configuration of the vehicle control system according to the present embodiment.

Next, a configuration example of a vehicle control system that executes the automated parking control described above will be described. FIG. 5 is a block diagram showing a configuration example of the vehicle control system according to the present embodiment. The vehicle control system 100 shown in FIG. 5 is mounted on the vehicle M1. Examples of the vehicle M1 include a vehicle in which an internal combustion engine is mounted as a power source, an electronic vehicle in which an electric motor is mounted as the power source, and a hybrid vehicle including the internal combustion engine and the electric motor. The electric motor is driven by a battery such as a secondary battery, a hydrogen fuel cell, a metal fuel cell, an alcohol fuel cell, or the like.

The vehicle control system 100 is a system for performing automatic operation of the vehicle M1. The vehicle control system 100 includes an electronic control unit (hereinafter also referred to as "vehicle ECU") 30 for automated driving control. The vehicle control system 100 includes a camera 12, a radar 14, an HMI unit 16, a communication device 18, a navigation device 20, and a vehicle-state detection sensor 22, which are connected to inputs of the vehicle ECU 30. The vehicle control system 100 further includes an electronic control unit (hereinafter referred to as "traveling device ECU") 40 for a traveling device connected to the output side of the vehicle ECU 30.

The camera 12 functions as information acquisition means for acquiring peripheral information of the vehicle M1, for example, a front camera for capturing an image of the front of the vehicle M1, a left rear camera for capturing an image of the left rear of the vehicle M1, and a right rear camera for capturing an image of the right rear of the vehicle M1. The images picked up by the cameras 12 are transmitted as image data to the vehicle ECU 30 at any time, and are subjected to image processes on the respective image data in the vehicle ECU 30. The peripheral information acquired by the camera 12 is, for example, positional information of peripheral vehicles traveling around the vehicle M1, partition line information such as white lines, and road information such as signal information.

The radar 14 is, for example, a laser radar, a millimeter wave radar, or the like, and functions as information acquisition means for acquiring peripheral information of the vehicle M1. The radar 14 transmits laser waves or the like to the front and the rear of the vehicle M1 and receives the reflected waves thereof to acquire peripheral information of the vehicle M1. The peripheral information acquired by the radar 14 includes, for example, information on the presence or absence of a peripheral vehicle, distance and angle to the peripheral vehicle (i.e., relative position), and speed (e.g., relative speed) information, and positional information of a utility pole, a building, or the like. The information detected by the radar 14 is transmitted to the vehicle ECU 30 at any time.

The HMI unit 16 is an interface for providing information to the driver and accepting information from the driver. For example, the HMI unit 16 includes an input device, a display device, and a speaker. Examples of the input device include a touch panel, a keyboard, a switch, and a button. The driver can input information such as a destination to the HMI unit 16 using the input device. The information input from the driver is transmitted to the vehicle ECU 30 at any time.

The communication device 18 functions as information acquisition means that receives peripheral information from a roadside unit (RSU) provided on a road via an antenna provided in the vehicle M1. The roadside unit is a beacon device that transmits, for example, traffic congestion information, traffic information for each lane, regulation information such as temporary stop, information on traffic conditions at blind spot positions, and the like. The communication device 18 also functions as information acquisition means for communicating with a surrounding vehicle in the vicinity of the vehicle M1 directly via an antenna or via a relay (not shown). As the peripheral information acquired here, for example, position information and speed information of peripheral vehicles are exemplified. The information received by the communication device 18 is transmitted to the vehicle ECU 30 at any time.

The navigation device 20 detects a current position of the vehicle M1 from a GPS satellite via an antenna, and detects the traveling speed of the vehicle M1, guides a path to a destination, and the like using a GPS, a speed sensor, a gyroscope, and the like. The navigation device 20 incorporates map data including detailed road information. The map data includes, for example, information on the shape of the road, the number of lanes, branches, lane widths, and the like. The present position information, the road information, and the like acquired by the navigation device 20 are transmitted to the vehicle ECU 30 at any time.

The vehicle-state detection sensor 22 detects the running state of the vehicle M1. Examples of the vehicle-state detection sensor 22 include a vehicle speed sensor, a lateral acceleration sensor, and a yaw rate sensor. The data detected by the vehicle-state detection sensor 22 is transmitted to the vehicle ECU 30 at any time.

The vehicle ECU 30 corresponds to a control device (controller) of the vehicle control system 100. Typically, the vehicle ECU 30 is a microcomputer including at least one processor, at least one memory, and at least one input-output interface. The vehicle ECU 30 performs automated driving to automatically drive the vehicle M1 to a destination. The vehicle ECU 30 includes a vehicle peripheral information acquisition unit 32, a path generation unit 34, a travel control unit 36, and a parking space search unit 38 as functional blocks for automatically driving the vehicle M1. The functional blocks shown in FIG. 5 are realized by the processor of the vehicle ECU 30 executing the control program stored in the memory based on the detection information of the various sensors described above.

The vehicle peripheral information acquisition unit 32 is a functional block for performing vehicle peripheral information acquisition process for acquiring vehicle peripheral information including a peripheral image of the vehicle M1. The vehicle peripheral information includes information on the current position of the vehicle M1 detected by the navigation device 20, in addition to the above-described surroundings information detected by the camera 12 or the radar 14.

The path generation unit 34 receives information necessary for generation of the target path from the vehicle peripheral information acquisition unit 32 via the input-output interface. Then, the path generation unit 34 generates a target path for moving the vehicle M1 to the destination based on the received information. The travel control unit 36 outputs information to the traveling device ECU 40 so that the vehicle M1 follows the generated target path.

The parking space search unit 38 is a functional block for performing a search process for searching a target parking space for parking the vehicle M1. The parking space search unit 38 receives information necessary for searching the target parking space from the vehicle peripheral information acquisition unit 32 via the input-output interface. Such information may include, for example, a wheel stop, a white line, a vehicle, and the like. The parking space search unit 38 searches for a parking space where the vehicle M1 can be parked based on the received information, and sets the parking space as a target parking space.

The traveling device ECU 40 is a microcomputer having a same configuration as the vehicle ECU 30. The traveling device ECU 40 includes a plurality of ECUs. These ECUs control various types of traveling devices (not shown) for automated traveling the vehicle M1 in accordance with various types of information input from the vehicle ECU 30. The traveling devices include a driving force output device, a steering device and a brake device. The driving force output device is a power source for generating a driving force. The steering device steers wheels. The brake device generates a braking force.

A known technique is applied to the automated driving performed by the vehicle ECU 30 except for the generation of the target path. Therefore, descriptions of the functions of the vehicle ECU 30 related to the automated driving are only described in the outline above. The function related to the generation of the target path, which is a feature of the present embodiment, will be described in detail later.

1-3. Functions of Vehicle ECU

In the vehicle ECU 30 of the present embodiment, automated parking control is performed to automatically park the vehicle M1 by searching for an empty parking space in a destination area such as a commercial facility. In the automated parking control, for example, an automated parking path is generated from the destination area to the target parking area to automatically park the vehicle M1. More specifically, the automated parking path is generated by the path generation unit 34 of the vehicle ECU 30.

Figure 6:
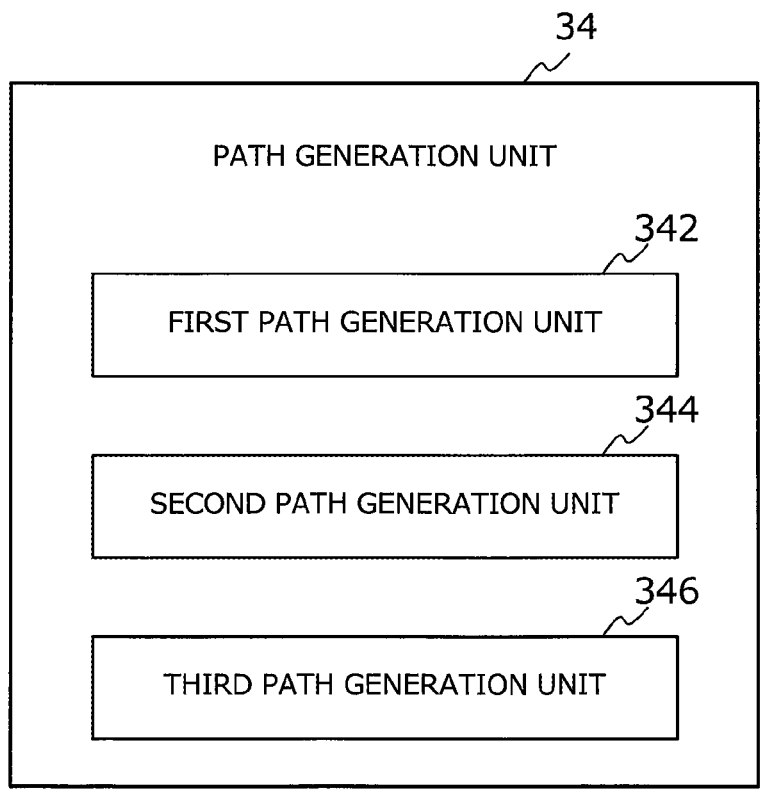
FIG. 6 is a block diagram showing a configuration of a functional block of a path generation unit included in a vehicle ECU according to the present embodiment.

FIG. 6 is a block diagram showing a configuration of a functional block of a path generation unit included in the vehicle ECU according to the present embodiment. As shown in FIG. 6, the path generation unit 34 of the vehicle ECU 30 includes a first path generation unit 342 as a search path generation unit, and a second path generation unit 344 and a third path generation unit 346 as a parking path generation unit, as functional blocks for generating the automated parking path in the automated parking control.

The first path generation unit 342 is a functional block for performing a first path generation process for generating a search path (i.e., first path) for searching for a target parking space. Details of the first path generation process will be described later along a flowchart.

The second path generation unit 344 is a functional block for performing a second path generation process for generating a parking path (i.e., second path) for moving the vehicle M1 to the front of the set target parking space. In the second path generation process, a known technique for generating a target path to a destination using vehicle peripheral information is used. The third path generation unit 346 is a functional block for performing a third path generation process for generating a parking path (i.e., third path) for parking the vehicle M1 in a section of a target parking space. In the third path generation process, a known technique for generating a parking path to a target parking space using vehicle peripheral information is used.

1-4. Specific Process of Automated Parking Control

Next, a specific process of automated parking control executed in the vehicle control system according to the present embodiment having the above-described configuration will be described with reference to a flowchart. More specifically, a case is exemplified in which, prior to the automated parking control, the automated driving control for automatically driving the vehicle M1 to the drop-off location in the destination area is executed.

Figure 7:
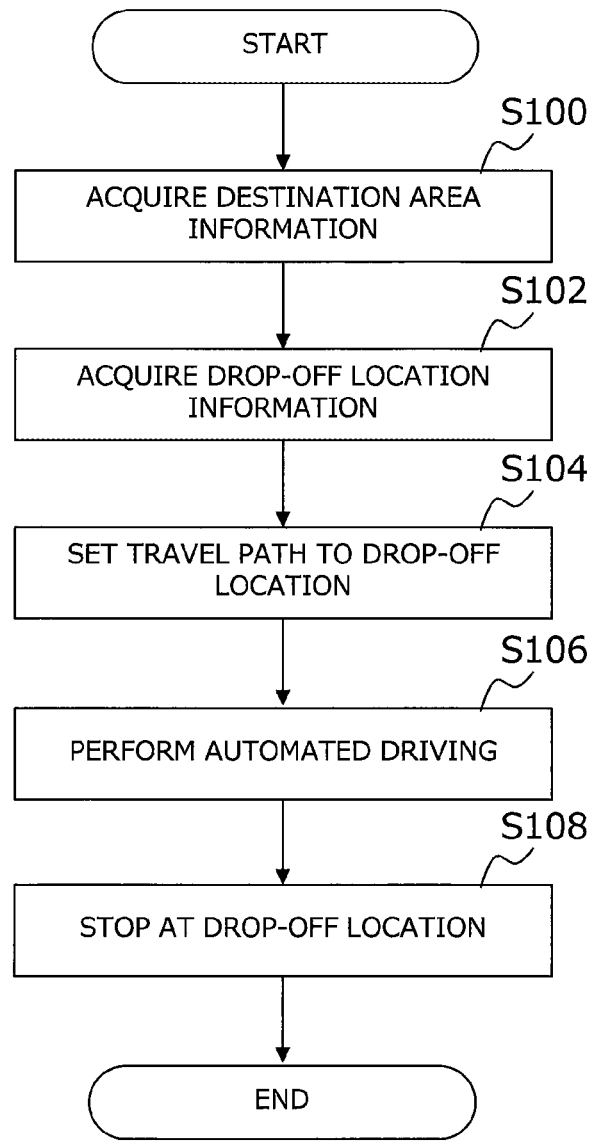
FIG. 7 is a flowchart showing a routine of an automated driving control executed in the present embodiment.

FIG. 7 is a flowchart showing an automated driving control routine executed in the present embodiment. The routines shown in FIG. 7 are executed in the vehicle ECU 30 included in the vehicle control system 100. In the routines shown in FIG. 7, first, in step S100, destination area information (e.g., shopping mall information) is input to the HMI unit 16. Next, in step S102, drop-off location information in the destination area is acquired. More specifically, for example, the drop-off location information in the destination area is acquired from the outside using the communication device 18. The information related to the drop-off location may be directly input to the HMI unit 16 by the driver.

Next, a travel path from the present position of the vehicle M1 to the drop-off location of the vehicle M1 is generated in step S104. More specifically, for example, using the map data sent from the navigation device 20, a travel path to the drop-off location in the destination area is set.

Next, in step S106, the automated driving is performed to cause the vehicle M1 to travel so as to follow the set travel path. In step S108, when arriving at the drop-off location in the destination area, the vehicle M1 is automatically stopped. The driver gets off the vehicle M1, which stops at the drop-off location. When the process of step S108 is completed, the present routine is terminated.

Figure 8:
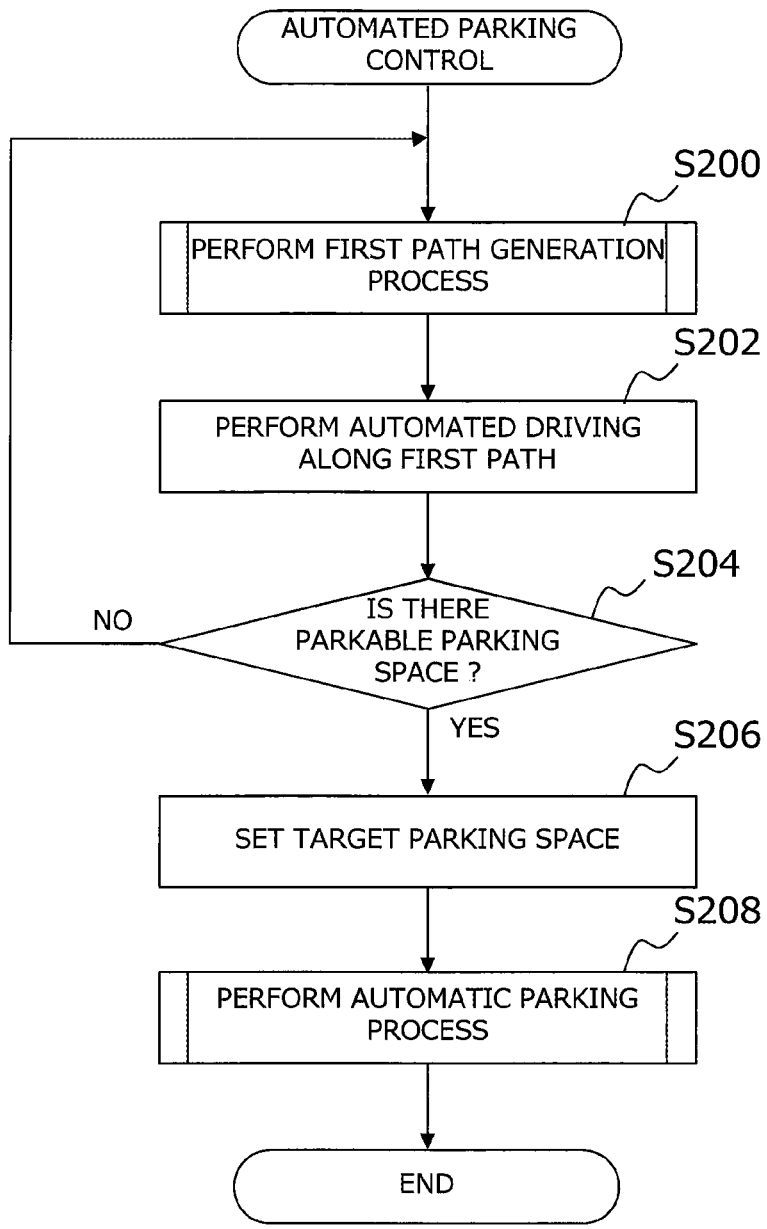
FIG. 8 is a flowchart showing a routine of the automated parking control executed in the present embodiment.

When the vehicle M1 arrives at the drop-off location by the automated driving control, the automated parking control is executed next. FIG. 8 is a flowchart showing an automated parking control routine executed in the present embodiment. The automated parking control of the routine shown in FIG. 8 is started after the vehicle M1 stops at the drop-off location, for example, upon detection of the driver's getting out. The automated parking control may be started by a button operation or the like by the driver. In the automated parking control, it does not matter whether the vehicle M1 is manned or unmanned.

Figure 9:
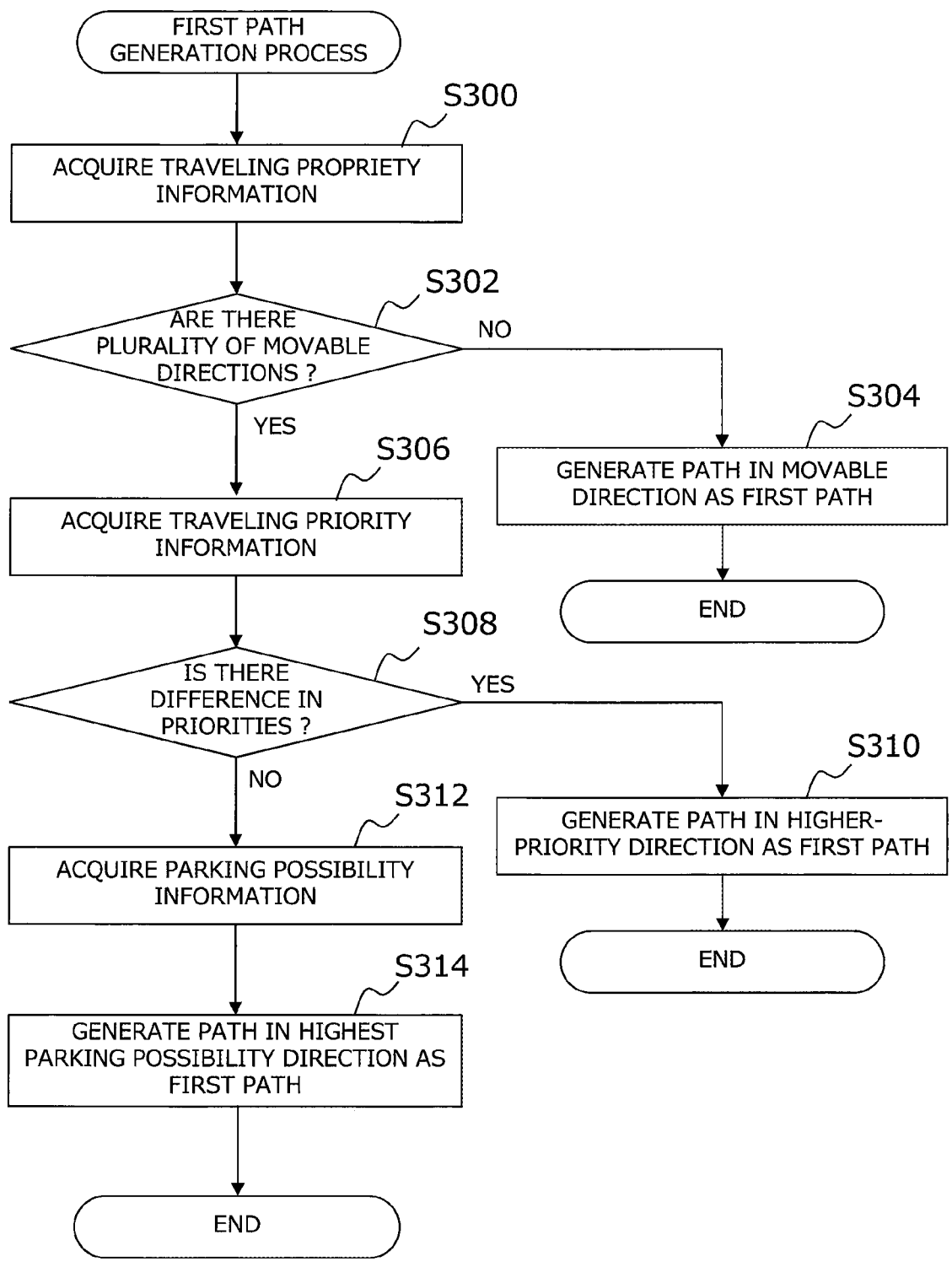
FIG. 9 is a flowchart showing a routine of a first path generation process executed in the present embodiment.

In the routine shown in FIG. 8, first, a first path generation process is performed in step S200. FIG. 9 is a flowchart showing a routine of the first path generation process. In the step S200, specifically, the process of the routine shown in FIG. 9 is executed.

In the routine shown in FIG. 9, in step S300, first, the traveling propriety information, which is the vehicle peripheral information relating to the travel propriety of the vehicle M1, is acquired. More specifically, of the vehicle peripheral information acquired by the vehicle peripheral information acquisition unit 32, the entry prohibition area, the barrier, the fence, the guard rail, the pole, and the like are read as landmarks of the traveling propriety information.

Figure 10:
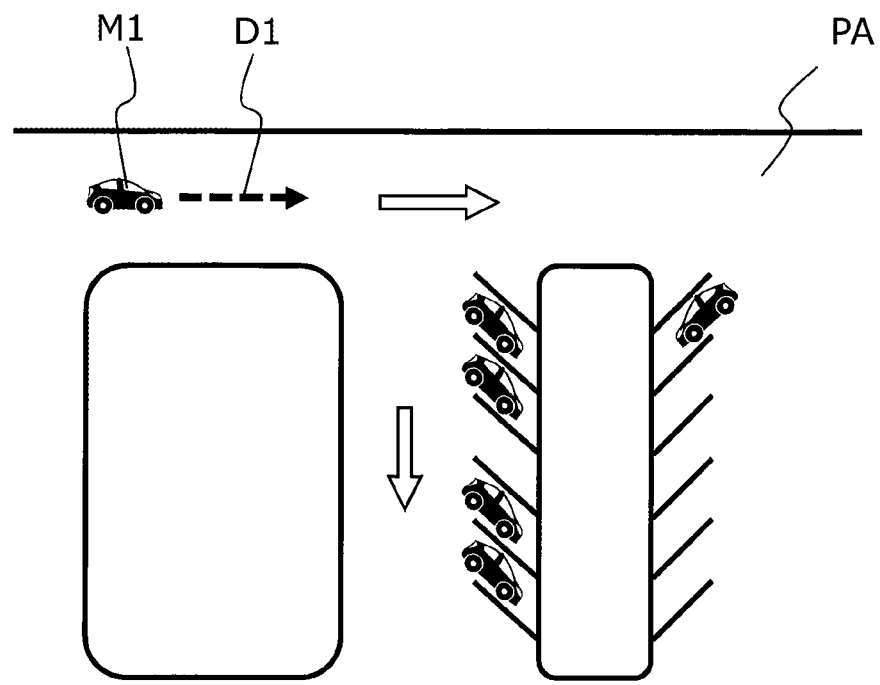
FIG. 10 is a diagram showing an example of a movable direction of the vehicle M1.

Next, in step S302, it is determined whether there is a plurality of movable directions of the vehicle M1 based on the read traveling propriety information. FIG. 10 is a diagram showing an example of a movable direction of the vehicle M1. In the example shown in FIG. 10, a case where the vehicle M1 is traveling at a point where the movable direction is only the straight traveling direction D1 is exemplified. In the determination of step S302, if only a single movable direction as illustrated in FIG. 10 is specified (i.e., when the determination of step S302 is "NO"), a path along the specified movable direction is generated as the first path T1 in step S304.

Figure 11:
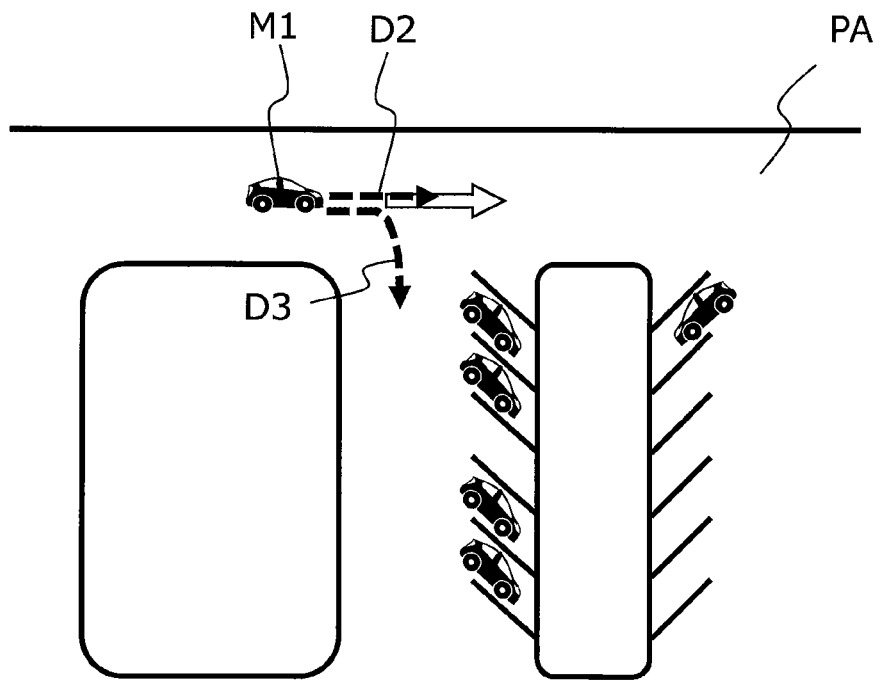
FIG. 11 is a diagram showing another example of the movable direction of the vehicle M1.

FIG. 11 is a diagram showing another example of the movable direction of the vehicle M1. In the example shown in FIG. 11, a case where the vehicle M1 is traveling at a point where the movable direction exists two directions of a straight traveling direction D2 and a right turning direction D3 is exemplified. In the determination of the step S302, if a plurality of movable directions are specified as shown in FIG. 11 (i.e., when the determination of the step S302 is "YES"), it is determined that the first path T1 may not be specified only by the traveling propriety information, and the process proceeds to the step S306.

In step S306, the traveling priority information that is the vehicle peripheral information relating to the travel priority of the vehicle M1 is acquired. More specifically, among the vehicle peripheral information acquired by the vehicle peripheral information acquisition unit 32, information of landmarks such as a road marking (e.g., arrow mark) indicating a priority in the traveling direction of the vehicle or a signboard display is read as the traveling priority information.

Next in step S308, priorities of the plurality of movable directions are compared based on the traveling priority information. In the example shown in FIG. 11, for example, when the road sign (e.g., arrow mark) indicating that the movable direction D2 is the priority direction is read as the traveling priority information, and the road sign (e.g., arrow mark) indicating that the movable direction D3 is the priority direction is not read, it is determined that there is a difference in the priorities of these directions, and the process proceeds to the process of step S310 (i.e., the determination of step S308 is "YES"). In the step S310, a path in a higher-priority direction (in the example case of FIG. 11, a path in the movable direction. D2) is generated as the first path.

Figure 12:
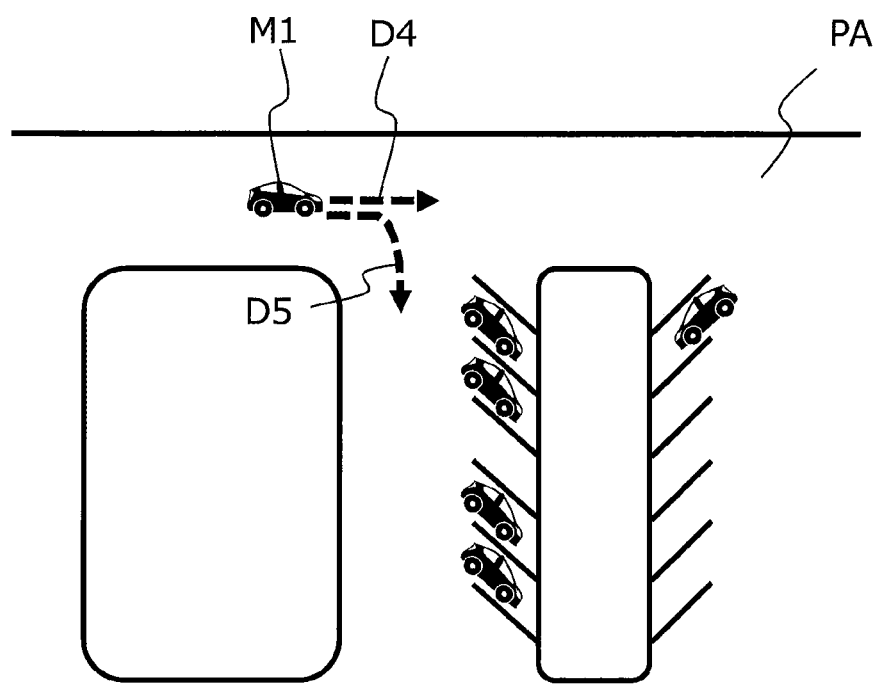
FIG. 12 is a diagram showing another example of the movable direction of the vehicle M1.

FIG. 12 is a diagram showing another example of the movable direction of the vehicle M1. In the example shown in FIG. 12, a case where the vehicle M1 is traveling at a point where the movable direction exists in two directions of a straight traveling direction D4 and a right turning direction D5 is exemplified. In the example shown in FIG. 12, for example, the road sign (arrow mark) indicating that the movable direction D4 or the movable direction D5 is the priority direction is not read as the traveling priority information. In this case, it is determined that there is no difference in the priorities of these movable directions in the processing of the step S308, and the processing proceeds to the processing of the step S312 (i.e., the determination of the step S308 is "NO").

In step S312, the parking possibility information, which is the vehicle peripheral information relating to the parking possibility of the vehicle M1, is acquired. More specifically, among the vehicle peripheral information acquired by the vehicle peripheral information acquisition unit 32, for example, the parking possibility information such as a stopped vehicle, a wheel stop, a parallel white line representing a partition line of a parking space, a signboard or a road sign of a parking mark (i.e., P mark), and a pole for separating persons and vehicles is read.

Next in step S314, the parking possibilities of the plurality of movable directions are compared based on the parking possibility information. More specifically, for example, it may be determined that there is a high possibility that the parking area PA is extended in the direction where there are many stopped vehicles and in the direction where there are signboards of the parking mark (e.g., P mark) or road signs. Further, it may be determined that the direction in which there are wheel stops or parallel white lines representing the parking line of the parking space is high possibility to be a direction in which there are a plurality of parking spaces. In addition, it can be determined that there is a high possibility that the direction of the parking area PA is also a direction in which a pole or the like for separating persons and vehicles exists. In the process of step S314, the movable direction having the highest parking possibility is specified based on the read parking possibility information, and the path of the specified movable direction is generated as the first path T1.

When the routine shown in FIG. 9 is executed in step S200, next in step S202, the automated driving is performed so that the vehicle M1 travels following the first path. More specifically, the travel control unit 36 of the vehicle ECU 30 outputs the information to the traveling device ECU 40 so that the vehicle M1 follows the generated target path. The traveling device ECU 40 automatically travels the vehicle M1 in accordance with various types of data input from the travel control unit 36 of the vehicle ECU 30.

Next in step S204, it is determined whether there is a parking space where the vehicle M1 can be parked. More specifically, a parking space search process for searching for a parking space based on the vehicle peripheral information is executed. As a result, if a parkable parking space is not be detected, the process returns to step S200 and the first path generation process is executed. On the other hand, if the parkable parking space is detected, the process proceeds to step S206 in which the detected parking space is set to the target parking space.

Figure 13:
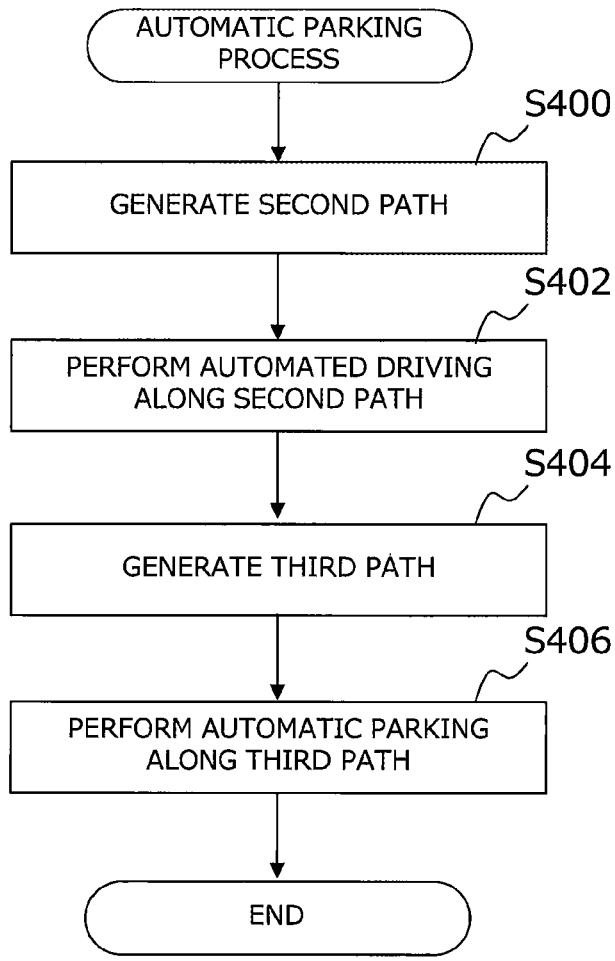
FIG. 13 is a flowchart showing a routine of the automatic parking process executed in the present embodiment.

In the routine shown in FIG. 8, the automatic parking process is performed in step S208. FIG. 13 is a flowchart showing a routine of the automatic parking process. In the step S208, specifically, the process of the routine shown in FIG. 13 is executed.

In the routine shown in FIG. 13, first, a second path generation process is performed in step S400. More specifically, the path from the current position to the front of the target parking space is generated as the second path based on the vehicle peripheral information. When the second path is generated in step S400, next in step S402, automated driving is performed so that the vehicle M1 travels following the generated second path. More specifically, the travel control unit 36 of the vehicle ECU 30 outputs the information to the traveling device ECU 40 so that the vehicle M1 travels along the generated second path. The traveling device ECU 40 automatically travels the vehicle M1 in accordance with various types of data input from the travel control unit 36 of the vehicle ECU 30.

Next in step S404, a third path generation process is performed. More specifically, a parking path for parking in the section of the target parking space from the current position is generated as the third path based on the vehicle peripheral information. When the third path is generated in step S404, next in step S406, the vehicle M1 is automatically driven to follow the generated third path. More specifically, the travel control unit 36 of the vehicle ECU 30 outputs the information to the traveling device ECU 40 so that the vehicle M1 travels along the generated second path. The traveling device ECU 40 automatically travels the vehicle M1 in accordance with various types of data input from the travel control unit 36 of the vehicle ECU 30.

According to such automatic parking control, it is possible to automatically search the target parking space and automatically park the target parking space without referring to the map data of the destination area.

1-5. Modified Examples of Vehicle Control System According to Present Embodiment The vehicle control system 100 according to the present embodiment may be applied with a configuration modified as described below.

In the first path generation process, the first path is determined based on the traveling propriety information, the traveling priority information, and the parking possibility information. However, the first path generation process is not limited to the combination as long as the first path is determined based on any of these pieces of information.

The parking possibility information is not limited to the landmarks acquired as the vehicle peripheral information, and may be information on the expansion of the space obtained from the vehicle peripheral information. In this instance, in the process of the step S314, a path in a direction closer to the spread direction of the space may be generated as the first path.

The parking possibility information may be information on a moving landmark acquired as vehicle peripheral information. That is, it may be determined that a place where a person, a vehicle, or the like moves is a place where a person gathers. There is a high possibility that there is a parking space in such a place where a person and a vehicle intersect with each other. Therefore, in the process of the step S314, when the information on the moving landmark is acquired as the parking possibility information, even if it cannot be judged as a person or a vehicle, a path in a direction closer to the direction of the moving target object may be generated as the first path. As a result, the parking possibility of the vehicle M1 can be increased.

Figure 14:
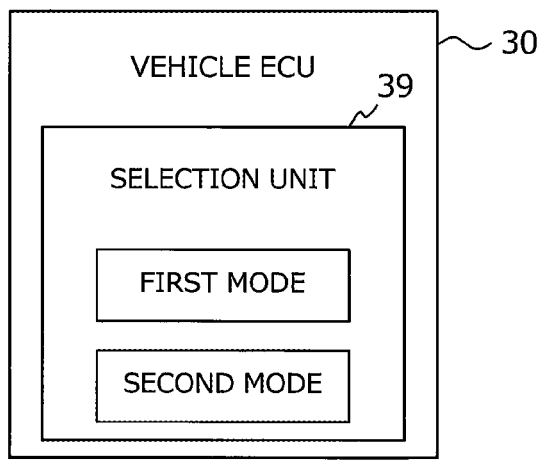
FIG. 14 is a block diagram showing a configuration of a selection unit included in the vehicle ECU as a modified example.

The vehicle control system 100 according to the present embodiment may be configured to select in advance whether to perform automated parking control after automated driving control. Such a configuration may be realized, for example, by providing a selection unit as a functional block in the vehicle ECU 30. FIG. 14 is a block diagram showing a configuration of a selection unit included in the vehicle ECU as a modified example. The selection unit 39 is configured to be capable of selectively selecting a first mode in which the automated parking control is not performed after the automated driving control, and a second mode in which the automated parking control is performed after the automated driving control. When the first mode is selected, the vehicle ECU 30 may control the vehicle M1 to stop when the vehicle M1 arrives at the destination by the automated driving control, and when the second mode is selected, the vehicle ECU 30 may control the vehicle M1 to start the automated parking control after arriving at the destination by the automated driving control. According to such a configuration, it is possible to prevent automated parking control not requested by the driver from being started when the vehicle M1 arrives at the destination.

What is claimed is:

1. A vehicle control system for performing an automated parking control for automatically park a vehicle at a target parking space in a destination area including a parking area, the vehicle control system comprising a processor configured to, when the automated parking control is executed,
generate a search path for searching for the target parking space as a target path based on vehicle peripheral information including an image of a periphery of the vehicle without using map data in the destination area, the vehicle peripheral information includes traveling priority information for determining a priority of a traveling direction of the vehicle, and
cause the vehicle to travel so as to follow the target path.

2. The vehicle control system according to claim 1, wherein the vehicle peripheral information includes traveling propriety information for determining traveling propriety of the vehicle.

3. The vehicle control system according to claim 1, wherein the vehicle peripheral information includes parking possibility information for determining a direction in which parking possibility is high.

4. The vehicle control system according to claim 1, wherein the processor is configured to search for the target parking space based on the vehicle peripheral information without using the map data in the destination area.

5. The vehicle control system according to claim 1, wherein the processor is configured to, when the target parking space is searched, generate a parking path to park the vehicle at the target parking space as the target path based on the vehicle peripheral information without using the map data in the destination area.

6. The vehicle control system according to claim 1, wherein the processor is configured to:
alternatively select a first mode in which the automated parking control is not executed and a second mode in which the automated parking control is executed in the destination area;
stop the vehicle when the vehicle arrives at the destination area when the first mode is selected; and
start the automated parking control successively after the vehicle arrives at the destination area when the second mode is selected.

7. A vehicle control system for performing an automated parking control for automatically park a vehicle at a target parking space in a destination area including a parking area, the vehicle control system comprising a processor configured to, when the automated parking control is executed,
generate a search path for searching for the target parking space as a target path based on vehicle peripheral information including an image of a periphery of the vehicle without using map data in the destination area,
cause the vehicle to travel so as to follow the target path,
search for the target parking space based on the vehicle peripheral information without using the map data in the destination area, and
when the target parking space is searched, generate a parking path to park the vehicle at the target parking space as the target path based on the vehicle peripheral information without using the map data in the destination area.

8. The vehicle control system according to claim 7, wherein the vehicle peripheral information includes traveling propriety information for determining traveling propriety of the vehicle.

9. The vehicle control system according to claim 7, wherein the vehicle peripheral information includes parking possibility information for determining a direction in which parking possibility is high.

10. The vehicle control system according to claim 7, wherein the processor is configured to:
alternatively select a first mode in which the automated parking control is not executed and a second mode in which the automated parking control is executed in the destination area;
stop the vehicle when the vehicle arrives at the destination area when the first mode is selected; and
start the automated parking control successively after the vehicle arrives at the destination area when the second mode is selected.

* * * * *